June 11, 1935. H. W. RUPPLE 2,004,347
MULTIPLE TURRET MACHINE TOOL
Filed Oct. 30, 1931 4 Sheets-Sheet 3
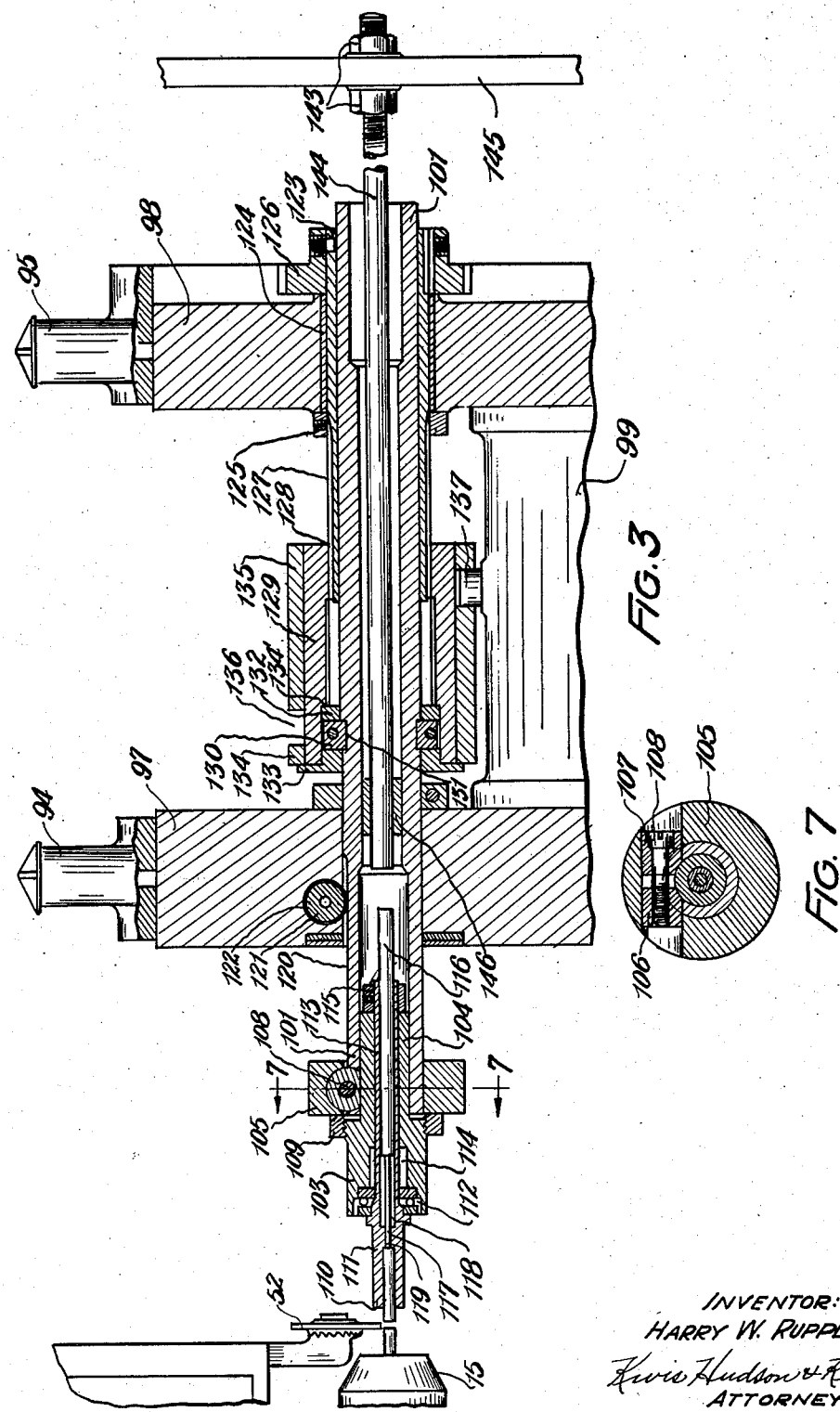

June 11, 1935.   H. W. RUPPLE   2,004,347
MULTIPLE TURRET MACHINE TOOL
Filed Oct. 30, 1931   4 Sheets-Sheet 4

INVENTOR:
HARRY W. RUPPLE
Lewis Hudson & Kent
ATTORNEYS

Patented June 11, 1935

2,004,347

UNITED STATES PATENT OFFICE 2,004,347

MULTIPLE TURRET MACHINE TOOL

Harry W. Rupple, Shaker Heights, Ohio, assignor to The Cleveland Automatic Machine Company, Cleveland, Ohio, a corporation of Ohio Application October 30, 1931, Serial No. 572,004

17 Claims. (Cl. 29—37)

This invention relates to metal working machines and more particularly to automatic machine tools of the type adapted to have work, which usually consists of stock bars or tubes, fed through a rotating spindle by automatic means at predetermined intervals, and articles formed on the ends of the work projecting through the spindles by one or a plurality of tools supported adjacent thereto. In machines of this general type one of the tools usually is a cutting off tool adapted to cut the formed article from the stock bar after the other operations are completed. Due to the unsupported weight of the article it breaks from the stock bar before the cutting operation is complete leaving a small burr on the end of the article which has to be removed by some subsequent operation.

An object of this invention is the provision of an automatic machine tool of the type adapted to have the work fed through the center of a rotatable spindle and articles formed on the end thereof which will support the work at the free end projecting through the spindle during one or more of the machine operations.

Another object of this invention is the provision of an automatic machine tool of the type referred to which will completely form and finish articles from stock fed therethrough at predetermined intervals.

Another object of this invention is the provision of an automatic machine of the type referred to which will sever a bar or tube, etc., and completely finishing the cut ends thereof at the same time.

Other objects of this invention are the provision of automatic machine tools of the types referred to which will feed a tool to the work upon the withdrawal of another tool, and/or a plurality of tools may be simultaneously fed radially to one or more work pieces.

Further objects and advantages will be apparent to those skilled in the art from the following description of the preferred embodiment of the invention described with reference to the accompanying drawings, in which:

Fig. 3 is a sectional view, with parts in elevation, taken on the line 3—3 of Fig. 5;

Fig. 7 is a sectional view, with parts in elevation, taken on the line 7—7 of Fig. 3.

Figure 1:
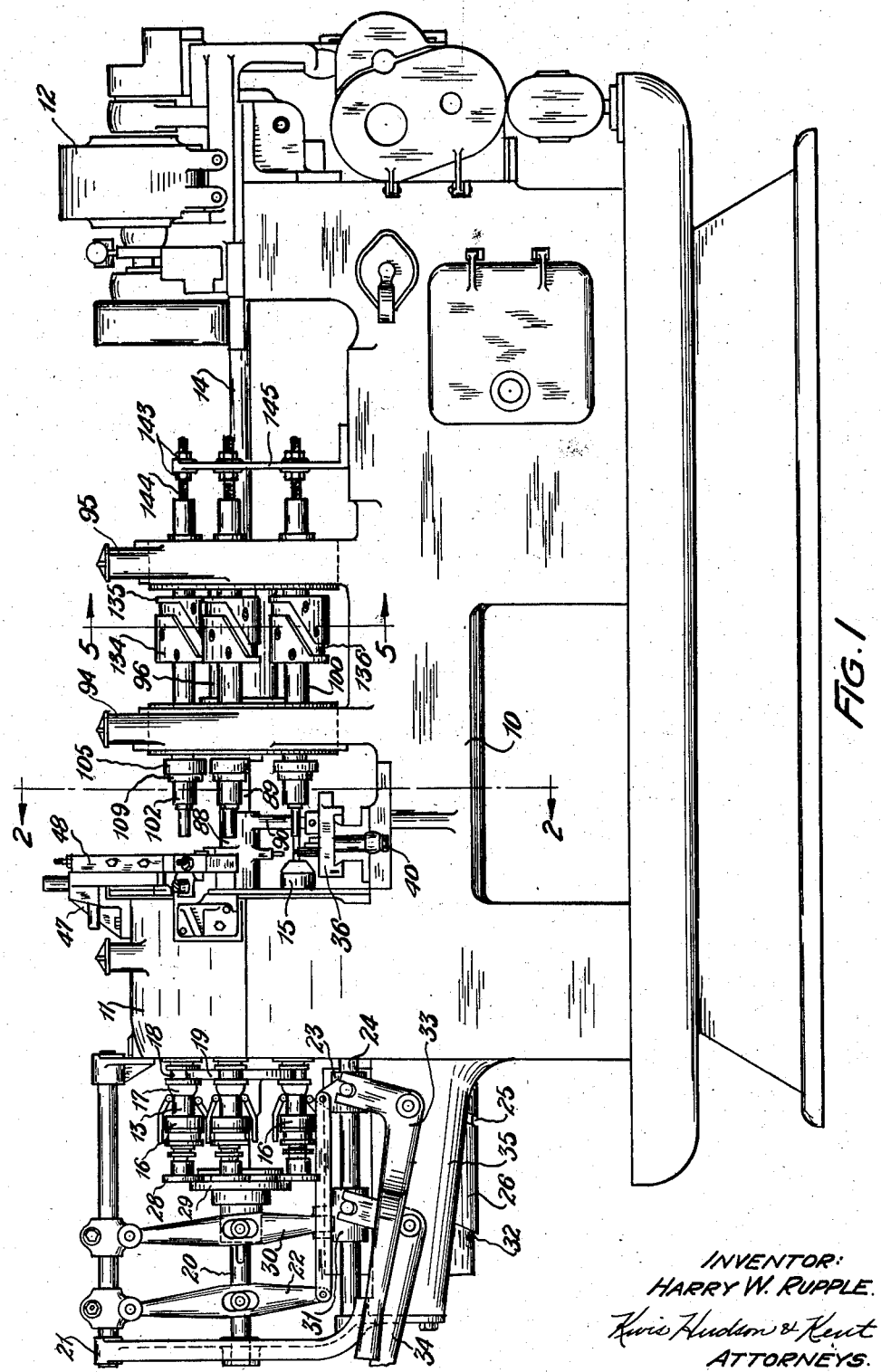
Figure 1 is a front view of an automatic machine tool embodying the present invention.
Figures 2, 4:
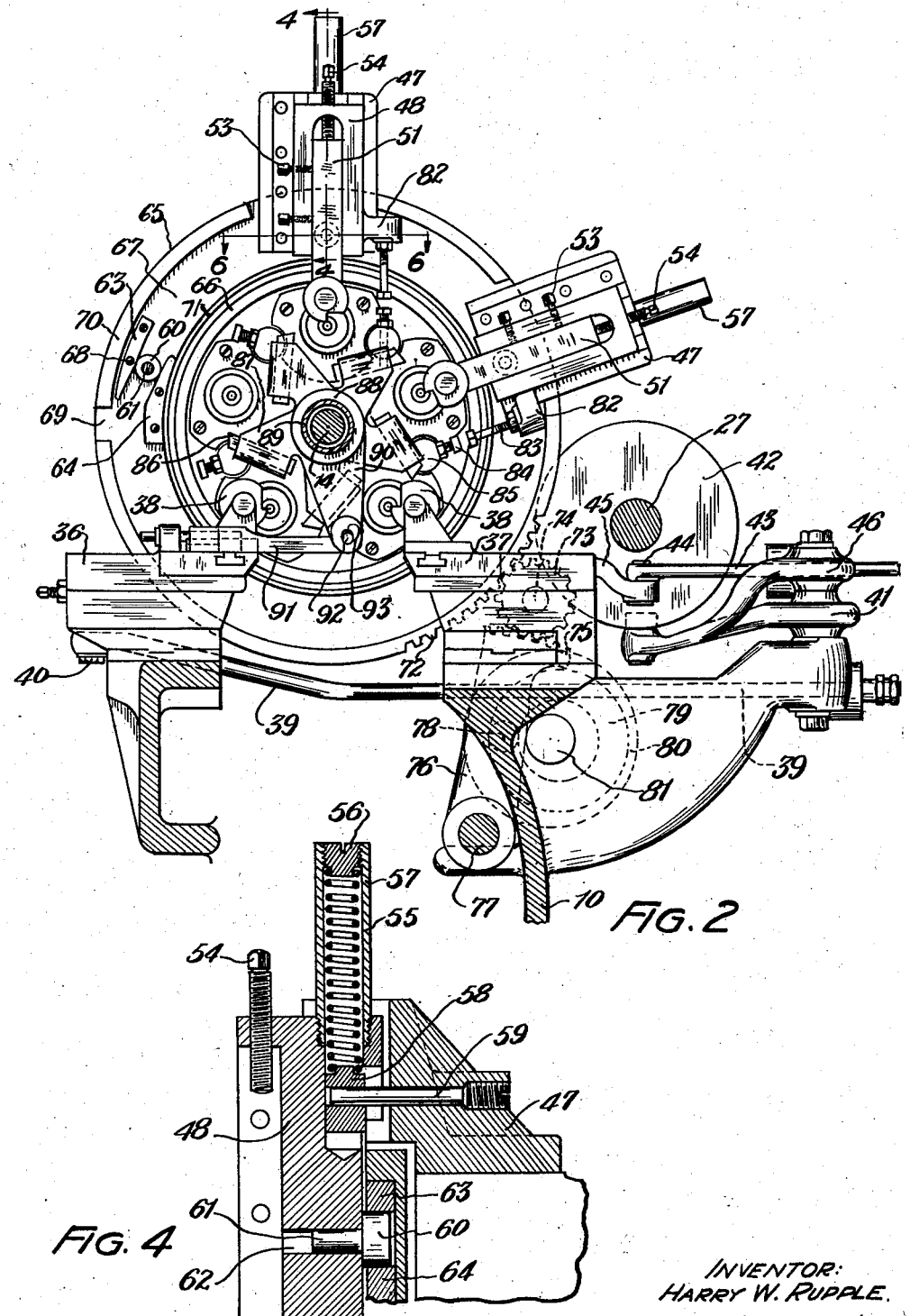
Fig. 2 is a sectional view, with parts omitted, taken on the line 2—2 of Fig. 1.
Fig. 4 is a sectional view, with parts in elevation, taken on the line 4—4 of Fig. 2.

The machine shown in Fig. 1 is a well known five position automatic machine tool and a complete description thereof is considered unnecessary. The various features of these machines are well known in the art and may be found embodied in a plurality of different structures.

The base of the machine is indicated in general by the reference character 10 and supports at one end a spindle head 11 and at the other end conventional mechanism indicated in general by the reference character 12 for driving the various parts of the machine. The spindle head 11 carries a plurality of spindles 13, in the present instance five, rotatably supported in suitable apertures extending longitudinally of the machine and driven from a main drive shaft 14 in any suitable manner. The spindles 13 are adapted to have the work fed through the center thereof and are similar in construction, carrying at one end a chuck 15 adapted to hold the work and at the other end mechanism indicated in general by the reference character 16 for operating the jaws of the chuck intermittently to grip the stock during the forming operation and to release it while the feeding mechanism is operated. Spindles of the type refered to are shown in United States patent to J. P. Brophy No. 1,779,529 issued October 28, 1930.

The mechanism 16 for operating the jaws of the chuck 15 is adapted to be engaged and operated by a collar member 17 slidably mounted on the spindle 13 and provided with a groove 18 about the periphery thereof. A shoe member 19, adapted to engage in the groove 18, is carried on a shaft 20 slidably supported in a bracket 21 and the spindle head 11. The shaft 20 is operatively connected by mechanism indicated in general by the reference character 22 to a member 23 slidably mounted on two parallel rods 24 fixed in the base of the machine. The member 23 is operated in timed relation to the feeding operation etc. by the engagement of a cam roller in a cam groove 25 on a cam drum 26 carried by the main cam shaft 27 of the machine. Feed collars 28 of the spindles 13 are adapted to be engaged and operated by a shoe member 29 slidably mounted on the shaft 20 and operatively connected by mechanism indicated in general by the reference character 30 to a member 31 slidably mounted on the rods 24 and provided with a cam roller adapted to engage in a cam groove 32 on the cam drum 26.

The members 23 and 31 may be manually operated by bell-crank levers 33 and 34 pivotally mounted on the horn 35 of the machine and provided with yoke ends adapted to engage pins secured to the respective members. The construction is such that just prior to the feeding operation, the members 17 are moved to release the jaws of the chucks 15, by the shoe member 19, the mechanism 22, the member 23 and the cam drum 26. After the chucks have released the work, the shoe member 29 moves the feed collars 28 toward the right, as viewed in Fig. 1, to feed the work through the spindle, after which the members 17 are moved in the reverse direction by continued rotation of the cam drum 26 and the chuck jaws again engage the work after which the feeding collars 28 are moved to their original positions.

Tool slides 36 and 37 are slidably mounted in suitable guides on the front and rear of the machine respectively and carry tools 38 supported thereon in any well known manner adapted to be fed to and operate on work held in the spindles adjacent thereto. The tool slide 36 is moved by means of a rod 39 pivotally connected at one end to a bolt 40 carried at the front of the slide and at the other end to one arm of a bell-crank lever 41. The other arm of the bell-crank lever 41 carries a cam roller adapted to engage in and be operated by a cam track on the cam drum 42 mounted on the main cam shaft 27. A tool slide 37 is operated by a rod 43 pivotally connected to a pin 44 secured in an arm 45 projecting from said slide and one arm of a bell-crank lever 46. The other arm of the bell-crank lever 46 carries a cam roller adapted to engage in and be operated by a cam track on the cam drum 42. The construction of the slides 36 and 37 and operating mechanism is similar to that shown in United States patent to Brophy previously referred to.

A bracket 47 is bolted or otherwise secured to the spindle head 11 adjacent each of the three upper spindles. These brackets 47 are similar in construction and carry tools adapted to engage with and operate upon work supported in the respective spindles. Each of the brackets 47 carries a tool slide 48 supported in suitable guide surfaces 49 and 50 provided therein. A tool holder 51 provided with a tool 52 of any suitable nature is adjustably fixed on the tool slide 48 as by the set screws 53 and the stop screws 54. A spring 55 compressed between a closed end 56 of a tube 57 carried by the slide 48 and a member 58 supported on a pin 59 carried in the bracket continuously urges the tool slide in a direction away from the work spindle. A cam roller 60 provided with a hub 61 rotatably mounted on the rear side of the slide 48 in an opening 62 engages with two cams 63 and 64 on a cam disk 65 rotatably mounted on a hub 66 of the spindle head 11. The cams 63 and 64 are located in a recess 67 in the cam disk 65 and are held in position by the screws 68. Openings 69 formed in the outer rim 70 of the cam disk 65 permit removal of the tool slides 48 when the cam disk 65 is so positioned that the openings 69 are in alignment with the cam roller 60. A wear plate 71 is interposed between the hub 66 and the cam disk 65.

The cam disk 65 has formed on the periphery thereof at one side a gear sector 72 adapted to be engaged by a pinion 73 rotatably mounted on a short shaft 74 secured in the base 10 of the machine in any suitable manner. The pinion 73 is also in mesh with a gear sector 75 carried on one end of an arm 76, the other end of which is pivotally supported on a shaft 77 mounted in the base 10 of the machine. The lever 76 is oscillated about the pivot 77 by a cam roller 78 carried by said lever and engaging in a cam groove 79 in the end of a cam drum 80 on a cam shaft 81. The cam shaft 81 is driven from the main cam shaft 27 of the machine by gears, not shown. The construction is such that as the cam disk 65 is oscillated by the engagement of the cam roller 78 on the lever 76 with the cam groove 79 in the cam drum 80, the cams 63 and 64 through the engagement of the cam rollers 60 therewith move the tool slides 48 together with the tools 52 carried thereby toward or from the work, depending upon the direction of movement of said disk. The cam disks 42 and 80 are preferably constructed so that the tools 38 and 52 move in unison, but this is not essential.

Each of the tool slides 48 is provided with a boss 82 having an adjustable stop in the form of a screw 83 threaded in an opening therein and adapted to engage with a similar stop 84 carried on a member 85 fixed to the spindle head 11. These stops operate to limit the feed movement of the tool.

A plurality of cutting-off tools 86 are carried in arms 87 projecting from a sleeve 88 rotatably mounted on a tube 89 surrounding the main drive shaft 14 and attached to the spindle head 11 in such a position that rotation of the sleeve 88 will move the tools into or out of their operating position, depending upon the direction of said rotation. The sleeve 88 carries at the right-hand end, as viewed in Fig. 1, an arm 90 projecting downwardly therefrom and connected to the tool slide 36 by a bar 91. One end of the bar 91 is adjustably connected to the tool slide 36 and the other end carries a pin 92 which engages in an elongated slot 93 in the lower end of the arm 90. The construction is such that as the slide 36 is moved to engage the tool carried thereby with the work, the sleeve 88 is rotated to disengage the tools 86 carried thereby, and as the slide 36 is moved to disengage the tool carried thereby from the work, the sleeve 88 is rotated in such a direction as to engage the tools 86 carried thereby with the work.

The bed 10 carries near the center thereof two vertically projecting members 94 and 95 which non-rotatably support a spool-shaped member 96 consisting of two end disks 97 and 98 connected by a reduced central portion 99. The member 96 carries a plurality of tail spindles 100, in the present instance five, non-rotatably but slidably supported in the disks 97 and 98 in axial alignment with the work spindles 13 in the spindle head 11.

The tail spindles 100 are similar in construction and consist of a tubular member 101 extending through the vertical projecting members 94 and 95, and carrying at the left hand end thereof, as viewed in Fig. 1 a chuck assembly designated in general by the reference character 102 adapted to engage and support the free end of a work piece projecting from one of the work spindles 13.

The chuck assembly 102 consists of a member 103 having a reduced end portion 104 projecting inside the tubular member 101 and held therein by a collar 105 and two wedge members 106 and 107 adapted to clamp the reduced portion 104 of the member 103 and the tubular member 101 together by the bolt 108. An adjusting ring 109 is threaded on the member 103 and abuts one face of the collar 105.

Resilient chuck jaws 110 are formed on one end of a member 111 rotatably mounted by anti-friction bearings 112 in the member 103. The other end 113 of the member 111 projects through an opening 114 in the member 103 and carries a collar 115 fixed thereto adapted to prevent longitudinal movement of the member 111 relative to the member 103. An ejector rod 116 provided with a reduced portion 117 is slidably mounted in an aperture 118 in the member 111. The reduced portion 117 projects into the space between the jaws 110 through an opening 119 communicating with the aperture 118 and is adapted to eject work held in the jaws 110 upon slidable movement thereof.

The tubular member 101 is provided with a flat surface 120 at the top adapted to be engaged by a roller 121 mounted in an aperture 122 in the member 97. The engagement of the roller 121 with the flat surface 120 prevents rotation of the tubular member 101 while permitting longitudinal movement thereof.

A sleeve member 123 surrounding the tubular member 101 is rotatably mounted in a suitable bearing 124 in the vertical projecting member 98 and held from longitudinal movement therein by a collar 125 fastened thereto at one side of the member 98 and a gear 126 keyed thereto at the other side of the member. The sleeve member 123 has a splined section 127 formed on one end thereof and slidably engaging a splined section 128 formed on the interior of a cam drum 129 rotatably supported on the tubular member 101 and the sleeve 123, see Fig. 3. A split ring 130 mounted in a groove 131 formed on the tubular member 101 is positioned between two ring members 132 and 133. The member 132 abuts against a shoulder 134' formed on the interior of the cam drum 129 and the member 133 by screws or other suitable means to the cam drum 129. The construction is such that the cam drum 129 may be rotated relative to the tubular member 101 through the splined connection from the sleeve 123 and the gear 126, but any longitudinal movement of the cam drum 129 will be imparted to the tubular member 101. The cam drum 129 carries cam plates 134 and 135 fixed thereto so as to form a cam groove 136 in which a roller 137 engages. The roller 137 has an elongated hub 138 which is rotatably mounted in a suitable aperture 139 in the member 99 and through the cam groove 136 reciprocates the spindle as the cam disk 129 is rotated.

Figure 5:
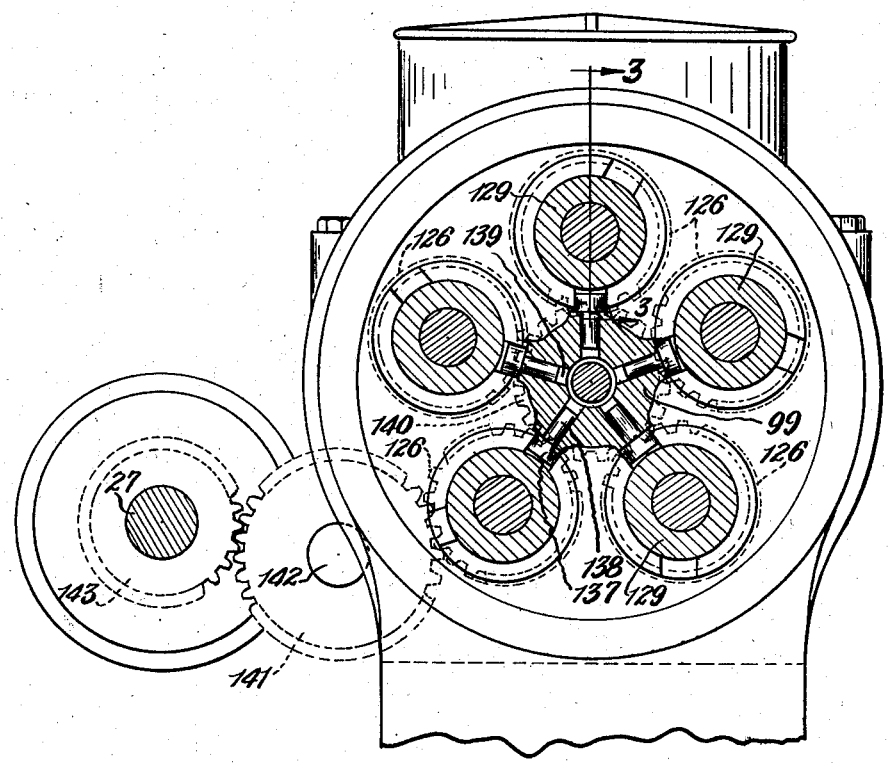
Fig. 5 is a sectional view, with parts in elevation, taken on the line 5—5 of Fig. 1.
Figure 6:
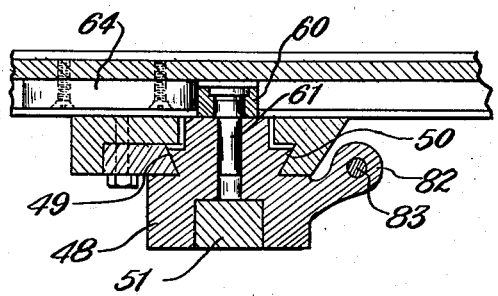
Fig. 6 is a sectional view, with parts in elevation, taken on the line 6—6 of Fig. 2.

The tail spindles are all similar in construction and the gears 126 carried thereon are in mesh with a gear 140 rotatably mounted on the shaft 14 extending through the center of the spool-shaped member 96. The gear 126 located on the lower left spindle, as viewed in Fig. 5, is in mesh with an idler gear 141 rotatably mounted on a shaft 142 supported in the base of the machine in any suitable manner. The idler gear 141 is in mesh with and driven from a gear 143 fixed on the main cam shaft 27 of the machine.

A rod 144 fixed as by the nuts 143 to a bracket 145 bolted or otherwise secured to the base 10 of the machine is adapted to extend into the tubular member 101 and engage the ejector rod 116 as the tail spindle is moved to its disengaged position. The rod 144 is supported at its free end in the tubular member 101 by means of a bushing 146 secured therein. The operation is such that as the tail spindle is moved to the right-hand position, as shown in Fig. 3, the rod 144 will engage the ejector rod 116 and as the chuck assembly, together with the tubular member 101, continues to move, the end 117 will engage the work held in the jaws 110 and eject the same therefrom.

The operation of the machine is as follows:

The work is automatically fed through the rotating work spindles at predetermined intervals by the feed collars 28 and the mechanism 30 etc. in timed relation to the other operations of the machine all of which are controlled from the main cam shaft 27. The chucks 15 are operated automatically to release the work during the feeding operation by the chuck operating mechanism including the parts 16, 17, 19, 20 and 22 etc.

After the feeding operation is completed and the work again clamped in the chucks the forming tools 38 and 52 are simultaneously given a feeding and return movement through the cam drums 42 and 80. During the return movement of the tools 38 and 52 the cutting off tools 86 are simultaneously moved to engage and cut off the work. At a predetermined time, depending upon the shape of the cam groove 136, after the work has been clamped in the chuck 15 and before the cutting off operation has been completed, the tail spindles 100 are advanced towards the head spindle until the jaws 110 engage and support the free end of the work projecting from the work spindles 13. After the completed article has been severed from the stock, the tail spindles are retracted and the work ejected from the clutch jaws 110 by the engagement of the ejector rod 116 by the rod 144. The cutting off tools are given a slight return movement so that they clear the work, after which the cycle of operation is repeated.

The mechanism shown at the extreme right-hand end of the machine in Fig. 1, and designated in general by the reference character 12, is merely a drive motor and the necessary gear trains and gear reduction, etc. common to these machines and forms no part of the present invention and will not be described. The chuck operating and work feeding mechanism shown in Fig. 1 is claimed in my copending application Serial No. 573,463, filed November 6, 1931.

While the invention has been illustrated as applied to a five position machine, it is understood that with slight modifications it could be applied to single or multiple position machines of either stationary or indexible turret types, and such construction is contemplated as within the scope of this invention. The embodiment of the invention described and illustrated is merely the preferred form, and I do not wish to be limited to the particular construction shown and described which may be varied within the scope of this invention, and I particularly point out and claim as my invention:

1. In a machine of the character described, the combination of a frame, a plurality of chucks rotatably supported by said frame, means for rotating said chucks, a plurality of tool slides supported by said frame adjacent said chucks and movable relative thereto in a plane transverse of the axis of said chucks, means continuously urging said slides in a direction away from said chucks, means rotatably supported by said frame for controlling the operation of said tool slides, and means for operatively connecting said last means and said tool slides.

2. In a machine of the character described the combination of a frame a plurality of work spindles rotatably supported by said frame and adapted to have work fed through the center thereof, means for automatically feeding work through said spindle at predetermined intervals, a tool slide carried by said frame, means for imparting a feed movement to said tool slide, a plurality of tail spindles rotatably supported by said frame, each of said tail spindles being paired with a work spindle, a chuck carried by said tail spindle, means for moving said tail spindle to engage said chuck with the end of the work projecting through said spindle, and means for ejecting the work from said chuck.

3. In a machine of the character described, the combination of a frame, means supported by said frame for rotatably supporting a work piece, a tool carrier for supporting a tool supported by said frame adjacent said means, a second tool carrier for supporting a tool supported by said frame adjacent said means, means for automatically moving one of said tool carriers toward and from said means at predetermined intervals, and means controlled by the movement of the last referred to of said tool carriers for automatically moving the other of said tool carriers in an opposite direction with reference to said means for supporting a work piece from that in which the tool carrier being moved by said means for moving one of said tool carriers is being moved.

4. In a machine of the character described, the combination of a frame, means supported by said frame for rotatably supporting a work piece, a tool carrier for supporting a tool supported by said frame adjacent said means, a second tool carrier for supporting a tool supported by said frame adjacent said means, means for automatically moving one of said tool carriers toward and from said means at predetermined intervals, and means operatively connecting said tool carriers for automatically moving the other of said tool carriers in an opposite direction with reference to said means for supporting a work piece from that in which the tool carrier being moved by said means for moving one of said tool carriers is being moved.

5. In a machine of the character described, the combination of a frame, means supported by said frame for rotatably supporting a work piece, a tool slide for supporting a tool supported by said frame, a tool carrier rotatably supported by said frame about an axis parallel to the axis of said means, means for automatically moving said tool slide toward and from said means at predetermined intervals, and means controlled by the movement of said tool slide for automatically moving said tool carrier in an opposite direction with reference to said means for supporting a work piece from that in which the tool slide is being moved.

6. In a machine of the character described the combination of a frame, a plurality of chucks rotatably supported by said frame, means for rotating said chucks, a tool carrier rotatably supported by said frame about an axis parallel with the axes of rotation of said chucks and equally spaced therefrom, a tool slide slidably supported by said frame, means for automatically moving said tool slide toward and from said chucks at predetermined intervals, and means controlled by the movement of said tool slide for automatically moving said tool carrier in an opposite direction with reference to said chucks from that in which said tool slide is being moved.

7. In a machine of the character described the combination of a frame, a plurality of work spindles rotatably supported by said frame and adapted to have work fed through the center thereof, means for automatically feeding work through the center of said spindles at predetermined intervals, a tool carrier rotatably supported by said frame about an axis parallel with the axes of said tool spindles and equally spaced therefrom, a tool slide supported by said frame adjacent said spindles, means for automatically moving said tool slide toward and from the work in predetermined timed relation to the actuation of said means for feeding work through the center of said spindles, and means operatively connected to said tool slide and said tool carrier for automatically moving said tool carrier in an opposite direction with reference to said spindles from that in which said tool slide is being moved.

8. In a machine of the character described, the combination of a frame, a spindle head supported by said frame, a plurality of work spindles supported by said spindle head, a plurality of tail spindles supported by said frame, each of said tail spindles being paired with a work spindle, means supported by said tail spindles for engaging the free ends of work carried in said work spindles, and individual means for automatically moving each of said tail spindles toward and from said work spindles at predetermined intervals.

9. In a machine of the character described, the combination of a frame, a plurality of work spindles supported by said frame, a chuck carried by each of said work spindles and adapted to support one end of work pieces, a plurality of tail spindles rotatably supported by said frame, a chuck carried by each of said tail spindles and adapted to engage and support the other end of said work pieces, each of said tail spindles being paired with a work spindle, individual means for operating said chucks to engage and disengage said work, and means for automatically producing relative movement between said spindles at predetermined intervals.

10. In a machine of the character described, the combination of a frame, a plurality of work spindles supported by said frame, a plurality of tail spindles supported by said frame in axial alignment with said work spindles, means carried by said tail spindles for engaging work supported in said work spindles, means for automatically moving said tail spindles toward and from said work spindles at predetermined intervals, and means for ejecting work from said first mentioned means.

11. In a machine of the character described, the combination of a frame, a plurality of work spindles rotatably supported by said frame, a plurality of tail spindles rotatably supported by said frame in axial alignment with said work spindles, chuck means supported by each of said work and tail spindles at the adjacent ends thereof and adapted to engage and support opposite ends of a work piece, means for automatically operating said chuck means supported by said work spindles at predetermined intervals, means for rotating a plurality of said spindles, means for supporting a tool adjacent each pair of work and tool spindles, and individual means for automatically reciprocating said tail spindles towards and from said work spindles in predetermined timed relation to the other automatic operations of the machine.

12. In a machine of the character described, the combination of a frame, a plurality of work spindles rotatably supported by said frame, a plurality of tail spindles rotatably supported by said frame in axial alignment with said work spindles, chucks supported by said work and tail spindles at the adjacent ends thereof adapted to engage and support opposite ends of work pieces, means common to all of said work spindles for automatically and simultaneously actuating said chucks carried by said work spindles at predetermined intervals, means for rotating a plurality of said spindles, means for supporting a plurality of tools adjacent said spindles, means for automatically reciprocating said tool supporting means towards and from said spindles in predetermined timed relation to the operation of said chucks carried by said work spindles, and individual means for automatically reciprocating said tail spindles towards and from said work spindles in predetermined timed relation to the automatic operations previously referred to.

13. In a machine of the character described, the combination of a frame, a plurality of work spindles rotatably supported by said frame and adapted to have work fed through the center thereof, means for automatically feeding work through the center of said spindles at predetermined intervals, a plurality of tail spindles rotatably supported by said frame in alignment with said work spindles, means for rotating said tail spindles, means for supporting a plurality of tools adjacent said spindles, means for automatically moving said tools towards and from said spindles in predetermined timed relation to the actuation of said means for feeding work through said spindles, and means for automatically reciprocating said tail spindles towards and from said work spindles in predetermined timed relation to the automatic operations of the machine.

14. In a machine of the character described, the combination of a frame, a plurality of work spindles rotatably supported by said frame and adapted to have work fed through the center thereof, a plurality of tail spindles rotatably supported by said frame in alignment with said work spindles, chucks supported by adjacent ends of said work and tail spindles whereby opposite ends of work pieces are adapted to be engaged and supported by said chucks, means common to said work spindles for automatically and simultaneously actuating said chucks carried by said work spindles, means for driving said tail spindles, means for automatically feeding work through said work spindles in predetermined timed relation to the operation of said chucks supported by said work spindles, a plurality of tool supports movably supported by said frame adjacent said work spindles, means for moving said tool supports in predetermined timed relation to the operation of said chucks, and means for automatically reciprocating said chucks supported by said tail spindles towards and from said work spindles at predetermined intervals.

15. In a machine of the character described, the combination of a frame, a plurality of work spindles rotatably supported by said frame and adapted to have work fed through the center thereof, means for automatically feeding work through said work spindles at predetermined intervals, a plurality of tool supports slidably supported by said frame adjacent said work spindles, means for automatically moving said tool supports towards and from said spindles in predetermined timed relation to the feeding operation, a plurality of tail spindles rotatably supported by said frame, chucks supported by said work and tail spindles at the adjacent ends thereof adapted to engage and support opposite ends of work, means common to said work spindles for automatically actuating said chucks supported by said work spindles in predetermined timed relation to the feeding operation, and individual means for automatically reciprocating the chucks supported by said tail spindles towards and from said work spindles.

16. In a machine of the character described, the combination of a frame, a plurality of spindles rotatably supported by said frame, a plurality of tool slides supported radially of said spindles and adapted to be moved towards and from the center thereof in a plane transverse to the axis of said spindles, cooperating stops on said slides and said frame for limiting the movement of said slides relative to said frame, yieldable means continuously urging said slides in one direction, a cam roller carried by each of said slides, a cam plate encircling said spindles rotatably supported by said frame, cams on said cam plate adjacent said slides for engaging said rollers to move said slides, and means for automatically moving said cam plate at predetermined intervals.

17. In a machine of the character described, the combination of a frame, a plurality of spindles rotatably supported by said frame, a plurality of tool slides supported radially of said spindles and adapted to be moved towards and from the axis thereof in a plane transverse to the axis of said spindles, cooperating stops on said slides and said frame for limiting the movement of said slides relative to said frame, yieldable means continuously urging said slides in one direction, a cam plate encircling said spindles rotatably supported by said frame, means for moving said cam plate at predetermined intervals, and means for operatively connecting said cam plate with said tool slides whereby the movement of said tool slides is controlled by the rotation of said cam plate.

HARRY W. RUPPLE.